J. MARTENS.
HOT WATER HEATER.
APPLICATION FILED SEPT. 7, 1916.
1,255,454.
Patented Feb. 5, 1918.
2 SHEETS—SHEET 2.
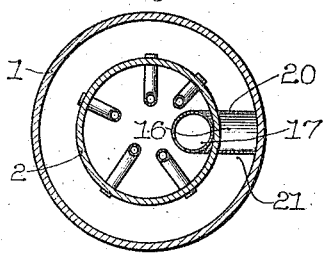
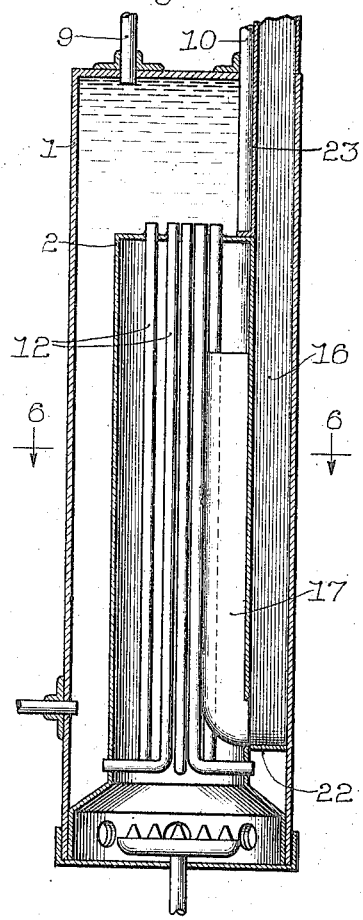
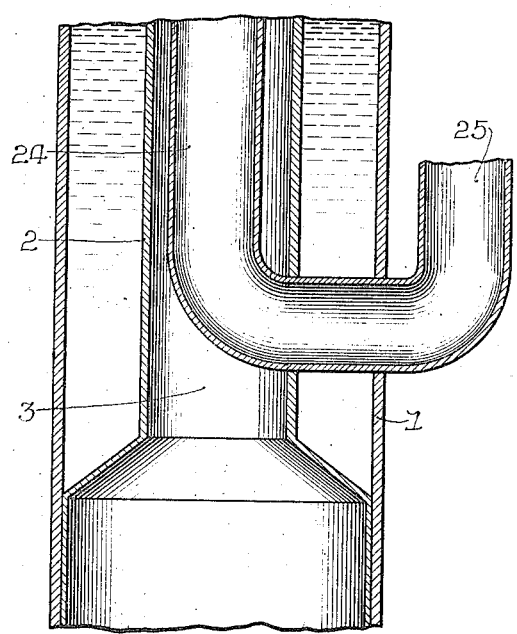
Inventor
John Martens
By Brown, Hanson & Boettcher
Attorneys

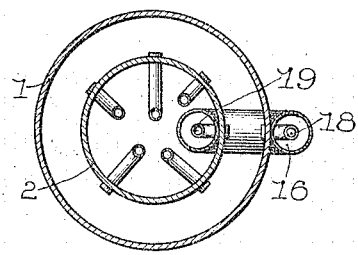
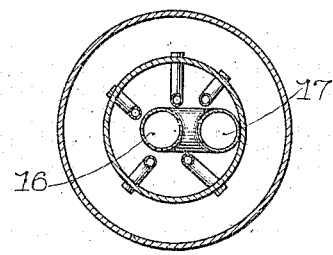
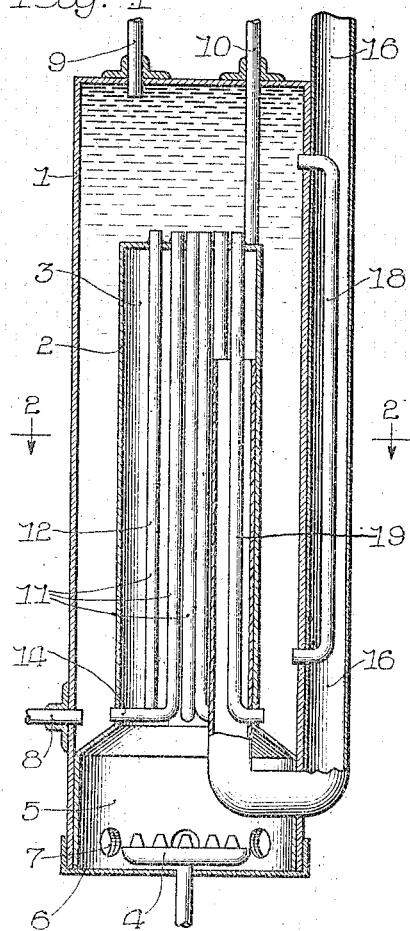
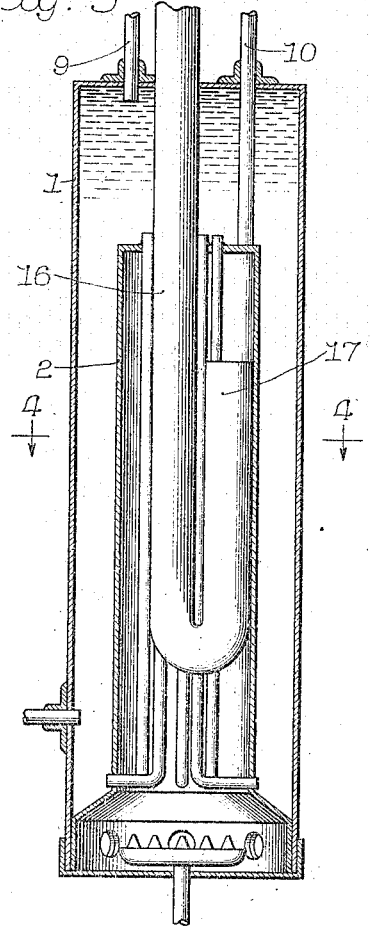

UNITED STATES PATENT OFFICE.

JOHN MARTENS, OF CHICAGO, ILLINOIS.

HOT-WATER HEATER.

1,255,454.   Specification of Letters Patent.   Patented Feb. 5, 1918.

Application filed September 7, 1916.   Serial No. 118,802.

*To all whom it may concern:*

Be it known that I, JOHN MARTENS, a citizen of the United States, residing at Chicago, in the county of Cook and State of Illinois, have invented a certain new and useful Improvement in Hot-Water Heaters, of which the following is a full, clear, concise, and exact description, reference being had to the accompanying drawings, forming a part of this specification.

My invention relates to hot water heaters and aims to provide an inexpensive simple and efficient heater of this type.

Simplicity and inexpensive construction are the essentials for the successful commercial production of a hot water heater.

In the construction of my heater I attain these objects by employing cylindrical shells of sheet metal which possess a durability amply sufficient to withstand the relatively low thermal values obtaining in a hot water heater.

I employ the downdraft principle in my heater without detracting from the simplicity of the structure and this principle together with the large heating area and novel flue arrangement tends to economy and efficiency.

Some of the various methods of practising my invention are illustrated in the accompanying drawings in which—

Figure 1 is a vertical sectional view of a form of my invention employing a plurality of individual heating tubes and having the updraft flue exterior of the outer shell;

Fig. 2 is a transverse sectional view of Fig. 1 taken on the line 2, 2, thereof;

Fig. 3 is a vertical sectional view of another form of my invention having the updraft flue contained within the combustion chamber;

Fig. 4 is a transverse sectional view of Fig. 3 taken on the line 4, 4, thereof;

Fig. 5 is a vertical sectional view of another form of my invention having the updraft flue included between the inner and the outer shells;

Fig. 6 is a transverse sectional view of Fig. 3 taken on the line 6, 6, thereof;

Fig. 7 is a longitudinal fragmentary sectional view illustrating a modified form of my invention.

This application is directed to modifications and improvements upon the hot water heater disclosed in my patent application Serial No. 40,498, allowed March 29th, 1916.

My invention provides an outer shell 1 which is substantially cylindrical and an inner shell 2 of less length between which is formed a space for the water to be heated. The inner shell 2 has a substantially cylindrical upper portion 3 which constitutes a combustion chamber for the gases generated at the burner 4, and a flared lower section 5 which serves as a housing for the burner 4. This burner may be of any preferred type, such as gas, hydrocarbon, oils or the like. The flared end 5 of the shell 2 is secured to the shell 1 as by riveting and is closed off by an end cap 6. A plurality of openings 7, 7, through shells 1 and 2 admit air for the burner 4.

Cold water is fed into the water space between the shells 1 and 2 through the inlet pipe 8 situated at the lower end of the shell 1. As the water is heated it rises to the top of the shell 1 where it is drawn off through the delivery pipe 9. An auxiliary heater such as a waterback in a stove may be employed to heat the water contained between the shells 1 and 2 and I have illustrated a pipe 10 as serving to conduct this preheated water to the main heater.

To obtain more heating surface and a more rapid circulation of water I dispose within the inner shell 2 heating tubes 11 consisting of a plurality of vertical pipe lengths 12, 12 connected with the lower end of the water space by the laterally extending pipe 14 projecting through the inner shell 2. It is to be understood that the pipes 11 may be disposed in the inner shell in the form of a helical coil or as a single straight length.

An exhaust flue 16 projects through the outer shell and opens into the combustion chamber at the upper end of the inner shell 2.

It is obvious that this feature of my invention may be employed without the tubes 11 as shown in Fig. 7 in which the downdraft flue 24 is disposed centrally within the combustion chamber and passes outwardly through the reduced portion 3 of the inner shell, through and upwardly exterior of the outer shell 1 forming the exhaust flue 25.

In the structure illustrated in Figs. 1 and 2 it will be noted that I have provided a plurality of individual heating tubes 12 which project radially into the lower end of the combustion chamber and then extend vertically up through the top of shell 2. These tubes are so disposed relatively to one another that the gases in ascending from the burner 4 are afforded no large continuous path but are thoroughly broken up into fluctuating currents in and around the tubes and flue. A flue 17 having its open end adjacent the top of the combustion chamber extends downwardly below the lower end of the reduced portion 3 of the inner shell and passes outwardly through the shells 1 and 2 below the water space and upwardly along the exterior of the outer shell 1. A heating tube 18 is mounted in the section of the flue exterior of the outer shell to utilize all the available heat. In a similar manner I have placed one of the vertical pipes 12 within the downdraft flue 17 as indicated at 19 in Figs. 1 and 2. This is not essential and I may construct the heater without the additional tubes 18 and 19 or with either one and without the other.

The point of egress of the flue from the combustion chamber can be widely varied to meet conditions. For example the flue may be extended out through the inner and outer shells at a point relatively high in the combustion chamber or may be continued down into the burner compartment 5 as shown in Fig. 1 or through the end cap 6 before being bent horizontally to be extended up along the exterior of the shell 1. All these departures from the showing are obvious and may be made for the purposes of facile construction or for obtaining different flue lengths and I consider the same to come within the spirit and scope of my invention.

In Fig. 3 both limbs of the flue are contained entirely within the heater. The flue has its inlet at substantially the same height as in Fig. 1 from whence it is extended down in the combustion chamber and looped back upon itself. The upward extension is passed through the top of the shell 2, through the water space and out through the top of the shell 1. The heating tubes 26 are suitably clustered about the flue to thoroughly break up the rising column of gases as hereinbefore explained in connection with Fig. 1.

In Fig. 5 the updraft flue 16 is embraced and defined by the inner and outer shells 1 and 2. The tubular section of the downdraft flue 17 terminates in the wall of the inner shell 2.

A pair of partitions 20, 21, suitably secured to the opposing walls of the inner and outer shells define a rectangular passageway for the gases after their passage from the flue 17. This passageway 16 is sealed from the water space by a plate 22 at the bottom thereof and by a plate 23 superposed upon the inner shell 2. By this construction a large surface having direct heat conduction into the surrounding water is provided. Obviously, this updraft flue may be of tubular form and a continuation of the downdraft flue 17 as illustrated in Fig. 1, without departing from the essence of including the flue between the shells.

I do not intend to be limited to the precise constructions illustrated and described, but desire to claim all variations and equivalent constructions which will immediately suggest themselves to those skilled in the art.

What I claim is:

1. In combination, an outer shell, an inner shell of less diameter than said outer shell, a burner in said inner shell, a plurality of longitudinal heating tubes in said inner shell, a flue having downdraft and updraft portions, the former being arranged within the inner shell and the latter externally of the outer shell, and a heating tube in the updraft portion of said flue communicating with the space between said shells.

2. In combination, an outer shell, an inner shell, said shells including a water space between them, a burner in the base of said inner shell, a plurality of longitudinal heating tubes in said inner shell, said tubes being connected at their lower ends with the lower end of said waterspace and having their upper ends projecting through the top of said inner shell into the upper part of said water space, and a flue having downdraft and updraft portions, the former being arranged within the inner shell and the latter externally of the outer shell, and a heating tube disposed longitudinally in the updraft portion of said flue, said tube communicating at its free end with the space between said shells.

3. In combination, an outer shell, an inner shell spaced from said outer shell, a firebox formed below said inner shell, a burner in said firebox, a downwardly extending flue having its open end adjacent the top of said inner shell, said flue passing out of said inner shell adjacent the bottom of said shells, and extending up the exterior side of said outer shell and a heating tube in said flue 4. In combination an outer shell, an inner shell comprising a flared base portion and a constricted upper portion, a burner in said flared portion, longitudinally extending heating tubes in said constricted portion, a downwardly extending flue having its open end adjacent the top of said constricted portion, said flue passing through said inner shell adjacent the flared portion thereof, and the updraft portion of said flue projecting through the outer shell and extending exteriorly thereof.

5. In combination an outer shell, an inner shell having a flared base portion, a burner in said flared base portion, a plurality of heating tubes vertically disposed in said inner shell, said tubes entering said inner shell radially at the lower end thereof and projecting up through the top of said inner shell and a flue tube extending through both of said shells at the lower ends thereof and extending vertically in said inner shell to a point adjacent the top thereof to define a downdraft flue space.

6. In combination, a heater having inner and outer shells forming an annular liquid space, a plurality of circulating pipes within the inner shell and communicating with said liquid space, a burner in the inner shell, a flue having downdraft and updraft portions, the former arranged with the intake end thereof adjacent the top of the inner shell and the latter flue arranged externally of the outer shell, and auxiliary liquid heating means disposed in the up and down draft portions of said flue and communicating with the space between said shells.

7. In combination, a pair of concentric shells annularly spaced, a plurality of circulating conduits in the inner shell, a flue having a downdraft portion in said inner shell and an updraft portion externally of the outer shell, and a pair of conduit sections disposed in the down and updraft portions of said flue and communicating with the space between said shells to serve as auxiliary heating means.

In witness whereof, I hereunto subscribe my name this 1st day of Sept. A. D. 1916.

JOHN MARTENS.